United States Patent [19]

Benn et al.

[11] Patent Number: 4,618,736

[45] Date of Patent: Oct. 21, 1986

[54] CONVERSION OF A MUNICIPAL WASTE TO FUEL

[75] Inventors: Frederick R. Benn, Sale; Charles A. McAuliffe, Altrincham, both of England

[73] Assignee: Salford University Industrial Centre Limited, Manchester, England

[21] Appl. No.: 763,049

[22] Filed: Aug. 6, 1985

Related U.S. Application Data

[63] Continuation-in-part of Ser. No. 549,543, Nov. 4, 1983, abandoned, which is a continuation-in-part of Ser. No. 331,732, Dec. 17, 1981, abandoned.

[30] Foreign Application Priority Data

Dec. 18, 1980 [GB] United Kingdom ............... 8040489

[51] Int. Cl.$^4$ ................................................ C10G 1/06
[52] U.S. Cl. .................................... 585/240; 201/2.5; 201/25
[58] Field of Search ............... 585/240; 208/10, 8 LE; 201/2.5, 25

[56] References Cited

U.S. PATENT DOCUMENTS

| 4,145,188 | 3/1979 | Espenscheid et al. | 44/50 |
| 4,155,832 | 5/1979 | Cox et al. | 208/56 X |
| 4,303,497 | 12/1981 | Mitchell et al. | 208/56 X |

FOREIGN PATENT DOCUMENTS

| 1100532 | 5/1981 | Canada | 585/240 |
| 2930032 | 1/1981 | Fed. Rep. of Germany | 585/240 |

Primary Examiner—Brian E. Hearn
Assistant Examiner—O. Chaudhuri
Attorney, Agent, or Firm—Alan H. Levine

[57] ABSTRACT

A process for converting cellulose-containing refuse into a fuel comprising forming a suspension of said cellulosic material in a polycyclic hydrogen donor substance and hydrogenating the suspension at elevated temperature and pressure in the presence of a catalyst to produce a mixture of gaseous, liquid and solid hydrocarbons having a low oxygen content and correspondingly high calorific value.

8 Claims, No Drawings

CONVERSION OF A MUNICIPAL WASTE TO FUEL

This is a continuation-in-part of application Ser. No. 549,543 dated Nov. 4, 1983 which is a continuation-in-part of application Ser. No. 331,732 dated Dec. 17, 1981, both now abandoned.

This invention relates to the hydrogenation of cellulose and more particularly but not exclusively the hydrogenation of waste containing cellulosic substances.

Municipal waste or refuse almost always contains cellulosic materials such as paper, vegetable matter, cellulosic textile materials. The proportion of such cellulosic materials in the waste is, of course, variable but nevertheless after screening of the waste to remove large pieces of waste it may contain up to 70% cellulosic material. This cellulosic material is an important commodity which at present is frequently unused.

Various attempts have been made to utilise refuse as a fuel. One such proposal is disclosed in U.S. Pat. No. 4,145,188 which describes a process in which bottoms from petroleum refining are mixed with refuse and heated in an open vessel. It is suggested in the aforesaid U.S. patent specification that process is a liquefactum process which yields a product having a homogeneous composition and having a flowable heavy oil or pitch-like consistency at 25° C. Attempts have been made to carry out this process but they have not resulted in any liquefactum. Instead a solid char-like product is formed. Because the process is carried out in an open vessel gases such as steam, carbon monoxide and hydrogen which may be produced during the reactum are allowed to escape and whatever benefit may be derived from those gases is lost. Finally, and perhaps the most significant problem, the product produced by the process of U.S. Pat. No. 4,145,188 has a relatively high oxygen content which means that the calorific value is correspondingly low.

It is well know that cellulose can be hydrogenated at elevated temperature and pressure in the presence of a metal catalyst in an oil solvent to form a mixture of gaseous, liquid and solid products. It is also known that certain hydrogen donor substances such as tetralin can be used to extract soluble components from coal and to facilitate hydrogenation of the soluble components.

It has now been discovered that cellulose can be hydrogenated in the presence of a hydrogen donor substance such as tetralin even though cellulose is not soluble in tetralin to yield a product having a low oxygen content and high calorific value.

According to the invention there is provided a process for the production of hydrocarbons from cellulosic material comprising the steps of forming a suspension of cellulosic material in a liquid polycyclic hydrogen donor substance, said liquid polycyclic hydrogen donor substance being a non-solvent for the cellulosic material, subjecting the suspension to increased pressure and elevated temperature to bring about hydrogenation of the cellulosic material and produce a mixture of gaseous, liquid and solid hydrocarbons having an oxygen content below 10% by weight, separating the mixture of hydrocarbon and recovering the liquid polycyclic hydrogen donor substance from the liquid phase.

The preferred polycyclic hydrogen donor substance is tetralin. Other useful hydrogen donor substances include partially reduced polycyclic aromatic compounds such as dihydroanthracene and dihydrophenanthrene; and crude polycyclic aromatic fractions. Crude polycyclic aromatic fractions may, if desired, be treated before use to partially hydrogenate them but it is econonmically advantageous to omit such partial hydrogenation.

The cellulosic material to which the invention can most usefully be applied is cellulosic material in domestic refuse or other municipal waste and cellulosic material obtained from plants. Preferably the waste is submitted to a pretreatment before the hydrogenation process. The pretreatment comprises screening to remove large non-cellulosic items if desired preceded or followed by comminution of the waste to reduce the particle size thereof and of the cellulosic material in the waste in particular.

The reaction is carried out in a suitable closed vessel at elevated temperature and pressure, if desired in a hydrogen atmosphere.

Municipal and plant refuse is normally wet and it is preferred to dry it and grind it prior to hydrogenation. It would appear that water plays a part in the hydrogenation reaction which is not disadvantageous, so that the refuse need not be completely dried and/or water can be added to it after it has been ground. It would appear that water which is present may generate hydrogen or other reducing agent by reaction with cellulose and in these circumstances it may be possible to reduce the amount of hydrogen gas supplied to the reaction. The presence of water can also help to prevent build up of deposits on heat transfer surfaces in the reaction vessel. A typical starting material would have a water content of up to 10% by weight preferably up to 5% by weight and a particle size of less than 250 microns.

The hydrogenation may be catalysed with a metal based catalyst such as nickel oxide but that is not essential. Catalysts which are less active than nickel, such as iron oxides have been found less satisfactory than nickel and other more active catalysts but they can be used if desired. It is also possible to use catalysts, such as palladium, which are more active than nickel but they are usually more expensive.

A mixture of gaseous, liquid and solid hydrocarbon products are formed. The phases may be readily separated by any suitable method and the liquid phase distilled to recover the polycyclic hydrogen donor substance for reuse and to obtain other fractions as desired.

The liquid fraction after distillation may be used as a fuel oil. Typically one would expect the oil to be characterised as follows:

| | |
|---|---|
| Carbon: Hydrogen atomic ratio | from 1:1.0 to 1:1.2 |
| Calorific Value | from 15,000 to 16,800 preferably 16,400 Btu/lb |
| Density | from 1.02 to 1.07 preferably 1.05 g/cm$^3$ at 20° C. |

When the liquid fraction is distilled at atmospheric pressure the following fractions can be expected:

| 16% | distils up to | 326° C. |
|---|---|---|
| 33% | " | 414° C. |
| 51% | " | 414° C. |

In one embodiment of the invention municipal refuse containing cellulosic material is placed in an autoclave together with a polycyclic hydrogen donor substance, water and a catalyst. The air in the autoclave is flushed out and replaced by hydrogen at a pressure preferably above 150 p.s.i. and preferably not exceeding 500 p.s.i.

The autoclave is heated preferably to a temperature above 200° C. and the contents agitated to bring about hydrogenation of the cellulosic material. During the hydrogenation reaction there is also an increase in pressure to a maximum which is about 1000 p.s.i. or more higher than the starting pressure.

The completion of the hydrogenation reaction is indicated by a fall in the autoclave temperature. The reaction products will vary both quantitatively and qualitatively in accordance with the nature of the starting material. Generally the reaction products includes a solid fuel char and liquid fuel, and a gaseous fuel. There will also be inert solids and water which need to be separated from the fuel components.

The hydrocarbon products of the hydrogenation can be used as fuels in place of conventional hydrocarbon fuels.

The following examples further illustrate the invention:

EXAMPLE 1

A two liter rocking autoclave was charged with the following mixture:

| | | |
|---|---|---|
| *Municipal Refuse | 207 | g |
| Tetralin | 666 | g |
| Water | 10 | g |
| Nickel oxide | 2 | g |
| Hydrogen | 1.9 | g |

(* The refuse contained about 70% by weight of cellulosic substnces about 5% by weight plastics material and about 25% 1nert materials such as sand).

The autoclave was loaded with the liquid and solid materials and then pressurised with the hydrogen, the resulting pressure being 330 p.s.i. The autoclave was then heated for one hour in a rocking furnace up to a maximum of 350° C.

Gaseous products were vented from the autoclave to a gas storage device. The autoclave was then opened to remove the contents which was in the form of a liquid having char and catalyst suspended therein and solid, substantially inert material. The liquid with suspended solids was decanted from the inert solids and was then subjected to vacuum filtration to extract the suspended solids. The liquid separated into two phases the lower of which was water. The upper phase was distilled through a short distillation column and three cuts were made to obtain tetralin for reuse in the process, a light oil and a heavy oil.

The yield of the products of the hydrogenation were as follows:

| | | |
|---|---|---|
| Gas | 20 | g |
| Light Oil | 4 | g |
| Heavy Oil | 124 | g |
| Char | 61 | g |
| Water | 21 | g |
| Inert solids | 65 | g |

The gas was examined and found to be a mixture of light hydrocarbons, predominantly methane with other alkanes having up to 3 carbon atoms. The gas also contained small quantitites of hydrogen and carbon dioxide.

The light oil cut was a fraction between 140° C. to 210° C. and consisted of complex hydrocarbons. It had a calorific value of $19 \times 10^3$ b.t.u. per pound.

The heavy oil was semi-solid material boiling above 80° C. at 5 mm HG also consisting of complex hydrocarbons. Further distillation of the heavy oil yielded viscous distillates and a pitch-like solid.

The same procedure was followed as in Example 1 but variations were made to the operating conditions and amounts of reactants and no catalyist was used. The results are set out in the following Table 1.

TABLE 1

| Example | 2 | 3 | 4 |
|---|---|---|---|
| Refuse g | 150 | 60 | 62 |
| Tetralin g | 614 | 450 | 450 |
| Water g | 8 | 3 | 12 |
| Recovered Tetralin g | 492 | 477 | 424 |
| Hydrogen charge g | 1.6 | 1.3 | 1.3 |
| Starting Pressure | 225 p.s.i. | 30 ats. | 30 ats. |
| Max. Pressure | 1500 p.s.i. | 110 ats. | 147 ats. |
| Starting Temp. °C. | 250 | | |
| Max. Temp. °C. | 345 | 350 | 350 |
| PRODUCTS | | | |
| *Volatile Oil g | 1122 | 935 | 903.6 |
| Heavy Oil g | 36.7 | 11 | not separated |
| Char g | 55 | 10.5 | 10.0 |
| Gas g | 20.35 | 8.4 | 4.9 |

*The volatile oil includes both light oil and tetralin.

The same procedure was followed as in Example 1 with variations to the operating conditions and using a nickel catalyst. The results are shown in the following Table 2.

TABLE 2

| Example | 5 | 6 | 7 | 8 | 9 |
|---|---|---|---|---|---|
| Refuse g | 100 | 100 | 100 | 100 | 100 |
| Tetralin g | 483 | 394 | 560 | 560 | 557 |
| Catalyst g | 1 | 1 | 1 | 1 | 5 |
| Water | 5 | 5 | 5 | 10 | 5 |
| Pressure after H2 charge p.s.i. | 450 | 210 | 500 | 500 | 510 |
| Max. Pressure p.s.i. | 2600 | 1100 | 1545 | 1690 | 1970 |
| Max. Temp. °C. | 340 | 340 | 370 | 370 | 370 |
| PRODUCTS | | | | | |
| Heavy Oil g | 16 | 17 | 14 | 13 | 18 |
| Light Oil g. | 3.5 | 3.0 | 6.5 | 6.0 | 8 |
| Gas g | 13.5 | 12.5 | 10.5 | 13 | 12 |
| Char g | 28 | 32 | 20 | 18 | 22 |

We claim:

1. A process for production of hydrocarbons from cellulosic material comprising the steps of forming a suspension of cellulosic material in a liquid polycyclic hydrogen donor substance, the suspension containing an amount of water equal to at least about 5%, but no more than about 10%, by weight of the cellulosic material, subjecting the suspension to a temperature above 200° C. and a pressure which increases to at least 1000 psi, in the presence of hydrogen, to bring about hydrogenation of the cellulosic material and produce a mixture of gaseous, liquid, and solid hydrocarbons having an oxygen content below 10% by weight and a calorific value greater than 15,000 Btu/lb, separating the mixture of hydrocarbons into gaseous, liquid, and solid phases, and recovering liquid polycyclic hydrogen donor substance from the liquid phase and recycling said recovered liquid hydrogen donor substance for treatment of fresh cellulosic material.

2. A process as claimed in claim 1, wherein the cellulosic material is derived from or comprised in refuse.

3. A process as claimed in claim 1, wherein the polycyclic hydrogen donor substance is tetralin.

4. A process as claimed in claim 1, wherein the hydrogenation is commenced at a pressure above 150 p.s.i.

5. A process as claimed in claim 1, wherein hydrogenation is carried out in the presence of a catalyst.

6. A process as claimed in claim 5, wherein the catalyst is nickel oxide.

7. A process as claimed in claim 1, wherein the liquid phase is distilled to recover at least a heavy fraction and light fraction.

8. A process as claimed in claim 1, wherein the cellulosic material has a particle size of less than 250 microns.

* * * * *